(12) United States Patent
Smith

(10) Patent No.: US 12,419,284 B2
(45) Date of Patent: Sep. 23, 2025

(54) FISHING LURE

(71) Applicant: Trent Smith, Paulina, OR (US)

(72) Inventor: Trent Smith, Paulina, OR (US)

( * ) Notice: Subject to any disclaimer, the term of this patent is extended or adjusted under 35 U.S.C. 154(b) by 0 days.

(21) Appl. No.: 18/823,576

(22) Filed: Sep. 3, 2024

(65) Prior Publication Data

US 2025/0072407 A1 Mar. 6, 2025

Related U.S. Application Data

(60) Provisional application No. 63/536,197, filed on Sep. 1, 2023.

(51) Int. Cl.
*A01K 85/14* (2006.01)
*A01K 85/00* (2006.01)

(52) U.S. Cl.
CPC .......... *A01K 85/14* (2013.01); *A01K 85/1841* (2022.02)

(58) Field of Classification Search
CPC ............................ A01K 85/14; A01K 85/1841
See application file for complete search history.

(56) References Cited

U.S. PATENT DOCUMENTS

| | | | | |
|---|---|---|---|---|
| 5,077,930 A * | 1/1992 | Berry | ...................... | A01K 85/14 43/42.22 |
| 5,412,901 A * | 5/1995 | Matinez | ................. | A01K 91/06 43/42.22 |
| 5,511,338 A * | 4/1996 | Costanzo | ................ | A01K 85/14 43/42.34 |
| 6,301,823 B1 * | 10/2001 | Monticello | ............ | A01K 85/14 43/42.24 |
| 6,516,553 B1 * | 2/2003 | King | ....................... | A01K 85/14 43/42.46 |
| 2003/0163944 A1 * | 9/2003 | Ooten Hanes | ......... | A01K 85/14 43/42.19 |
| 2005/0166444 A1 * | 8/2005 | Taylor | ..................... | A01K 85/14 43/42.13 |
| 2014/0059916 A1 * | 3/2014 | Culver | .................... | A01K 85/02 43/42.1 |

FOREIGN PATENT DOCUMENTS

| | | | | |
|---|---|---|---|---|
| AU | 2002100222 A4 * | 5/2002 | | |
| CA | 2275052 A1 * | 12/2000 | ............. | A01K 85/14 |
| CA | 2727225 A1 * | 6/2012 | ............. | A01K 85/00 |

* cited by examiner

*Primary Examiner* — Christopher P Ellis
(74) *Attorney, Agent, or Firm* — Donn K. Harms

(57) ABSTRACT

A user-configurable fishing lure is provided allowing the user to customize movement of the lure when pulled through water by an attached fishing line. A slot communicating through the body of the lure at a second end defines two bendable portions of the body on opposing sides of the slot. User bending of one or both of the bendable portions to different bent configurations will impart differing oscillating and spinning and other movements to the lure when pulled through the water.

9 Claims, 4 Drawing Sheets

FISHING LURE

This application claims priority to U.S. Provisional patent application Ser. No. 63/536,197 filed on Sep. 1, 2023.

FIELD OF THE INVENTION

The present device relates to fishing and the use of lures. More particularly, the disclosed device and system relate to a fishing lure which is user configurable to customize the in-water movement and action during use.

BACKGROUND OF THE INVENTION

Fishing lures are a type of artificial bait used for fishing which are replicas designed to mimic real prey animals found in waterways. To that end, such lures are configured to attract the attention of predatory fish, using appearances, flashy colors, bright reflections, movements, vibrations or noises to appeal to the predation instinct of fish to entice it into striking.

Such lures are conventionally engaged to the distal end of fishing line and are equipped with one or a plurality of hooks which are provided in various styles. Such fishing lures are purposely designed to fool carnivorous fish to elicit an aggressive strike upon the lure. The force of such an aggressive strike, conventionally, provides a tactile signal to the angler to yank the line and thereby set the hook into the mouth of the attacking fish.

The large majority of fishing lures are commercially manufactured and sold. In use, such fishing lures are typically cast by the user using a fishing pole. Once deployed into the water on a fishing line, the lure is manipulated with a fishing rod by winding the fishing line to which it is engaged upon a fishing reel and moving the fishing pole. Where employed for recreational fishing, such as in streams, lakes and even the ocean, the lure is repeatedly cast out while engaged on the fishing line. It is then reeled back towards the angler. During this retrieval, the lure will interact with the water and water currents, thereby creating vibrations, turbulent splashes and/or popping actions. Using such lures, a skilled angler can explore many possible hiding places for fish through lure casting under logs, grass, and on flats.

The forgoing background concerning fishing lures and attractant systems and some of the limitations related therewith, are intended to be illustrative and not exclusive, and they do not imply any limitations on the user customized lure device and system described and claimed herein. Various other limitations of the related art of fishing lures are known or will become apparent to those skilled in the art upon a reading and understanding of the specification below and the accompanying drawings.

It is an object of this invention to provide a fishing lure which is configured for bending by a user to customize the movement of the lure during use.

It is a further object of this invention to provide such a fishing lure device which includes suggested bend positions which correlate to a specific movement by the lure in water.

These and other objects, features, and advantages of the present fishing lure device and system herein, as well as the advantages thereof over existing prior art, which will become apparent from the description to follow, are accomplished by the improvements described in this specification and hereinafter described in the following detailed description which fully discloses the invention, but should not be considered as placing limitations thereon.

SUMMARY OF THE INVENTION

The device and system herein provides a fishing lure having a body which is configured for shaping by the user or angler to yield specific movements by the lure body when pulled through the water.

The disclosed device includes a body formed of a pliable metal material, such as brass, tin, steel, stainless steel, bronze, or similar metals. The body may be formed of one or a plurality of such metals to yield the desired mass which will sink or rise to a desired level within the water when pulled therethrough.

The body is formed in a planar bendable configuration which has a first end opposite a second end. At the first end of the body is preferably located an attachment point to which the body is securely engageable to a fishing line. Currently, an aperture formed adjacent to a first side of the body provides such a connection point.

At the second end of the formed body are positioned one or a plurality of gear connection points. These connection points are configured for operative engagement to hooks or other fishing tackle the user employs during use. Currently, one or a plurality of openings communicating through the body at locations adjacent the second end, provide such connection points.

Particularly preferred in all modes and configurations of the body of the lure device herein is the positioning of a slot extending axially toward the first end of the body from a communication of the slot with the edge of the second end of the body. The slot provides for easy configuration of bendable sections on opposing sides of the slot by the user. These bends will change the way the body of the lure moves through water when pulled by the line and allow the user to customize the body of the lure to their liking and the fish and fishing conditions.

In an additional preferred mode of the lure device herein, the provision of, as shown in FIGS. 3 and 5, the body 12 of the lure device's 10 suggested fold lines may be imparted to one or both side surfaces of the body. These fold lines can be positioned on one or both sides of the body using stamping to form recessed areas which will allow easy folding along them, or they may be imparted by engraving, laser etching, inked indicia, or other means for positioning fold lines on one or both side surfaces of the body. The fold lines, when provided, may be employed by the user to achieve a particular movement or action of the fishing lure, once bent. The user may, thus customize their lure, for movement in a repeatable manner where folding a subsequent lure with the same shaped body will cause the same movement or action thereof during use.

Further, the lure device may be provided with a fold guide either in print or in a phone application, which will depict folds along different fold lines or areas of the body, which will correlate to a respective movement or action the body will achieve in the water with the depicted folds. The provider of the lure device can thus also provide a guide and suggestions for folding the body in a manner which will yield predictable and repeatable results where the multiple bodies will move in a substantially similar fashion where folded in a substantially similar manner in the guide.

While the user configurable lure device and system herein is being described in detail, it is to be understood that the invention is not limited in its application to the details of construction and/or to the arrangement of the steps in the employment of the device and system in the following description or illustrated in the drawings.

The user configurable lure device and system herein is capable of other embodiments and of being practiced and carried out in various ways which will become obvious to those skilled in the art on reading this disclosure. Also, it is to be understood that the phraseology and terminology employed herein are for the purpose of description and should not be regarded as limiting.

As such, those skilled in the art will appreciate that the conception upon which this disclosure is based, may readily be utilized as a basis for other such user configurable lure systems. It is important, therefore, that the claims herein be regarded as including such equivalent configurations, components, construction and methodology for such insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The term "substantially", unless otherwise specifically defined, means plus or minus five percent.

These and other objects, features, and advantages of the user configurable fishing lure device as disclosed herein, as well as the advantages thereof over existing prior art, will become apparent from the description to follow. Such are accomplished by the improvements described in this specification and hereinafter described in the following detailed description which fully discloses the use configurable lure device and system herein, but should not be considered as placing limitations thereon.

BRIEF DESCRIPTION OF DRAWING FIGURES

The accompanying drawings, which are incorporated herein and form a part of the specification, illustrate some but not the only or exclusive examples of embodiments and/or features of the disclosed user configurable lure device and system. It is intended that the embodiments and figures disclosed herein are to be considered illustrative of the lure device and system invention herein, rather than limiting in any fashion.

DETAILED DESCRIPTION OF THE INVENTION

Figure 1:
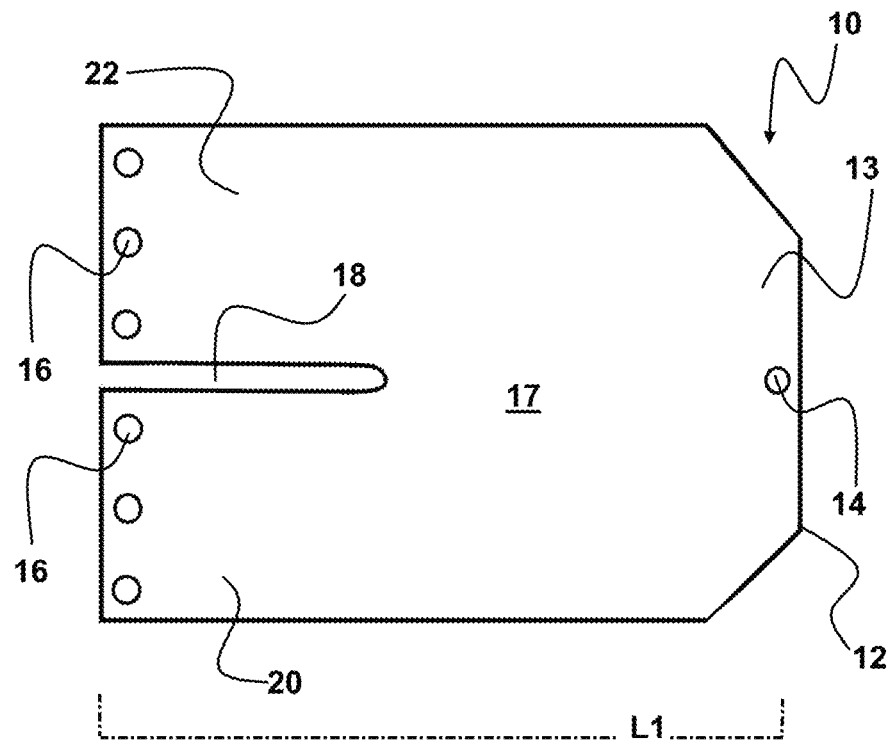
FIG. 1 depicts an overhead view of a side surface of one preferred mode of the fishing lure herein.

In this description, the directional prepositions of up, upwardly, down, downwardly, front, back, top, upper, bottom, lower, left, right, first, second, and other such terms refer to the fishing lure device as it is oriented and appears in the drawings and all such terms are used for convenience only and such are not intended to be limiting or to imply that fishing lure device has to be used or positioned in any particular orientation.

Now referring to drawings, in FIGS. 1-7 there is seen an overhead view of a first side surface of the body 12 of the lure device 10. The body 12 is preferably configured of planar material, such as metal, which is pliable and has a memory such that the body 12 may be bent to bent configurations of either or both the first bendable portion 20 and/or said second bendable portion 22 and the bends or bend will be maintained. The formed bends allow the user to impart and change rotational or oscillating movement of the body, when pulled through water by a fishing line, to elicit desired movements or action of the lure device 10 when pulled through water. The device may be formed of other material, such as polymeric materials. However, currently, metal is favored for use for the body 12 as it may be varied depending on the depth and amount of drag the lure device 10 will develop. Such metals employed for the body 12 herein, for example and in no way limiting, may be one or a plurality of metals from a group including steel, stainless steel, brass, bronze, tin, copper, and other metals which, when formed to the body 12, may be initially formed planar but are bendable by the user. Currently, the metal sheet material varies in thickness due to the differing bending and resistance to bending of various metal materials. For example only and in no way to be considered limiting, copper or brass sheet material employable may be from 5 mil to 20 mil thickness with 18 mil working well to hold bends. Stainless sheet material may be used in a thinner sheet of material as it will hold the bend imparted by the user in a thinner plate material, such as 15 mil. In all modes of the device 10, the desirable material will be bendable by the hands of the user and have memory in that it will hold the shape of the bend, once the user is finished.

At a first end 13 of the body 12 of the lure device 10 is preferably positioned an attachment point 14 for a fishing line used in combination herewith. As shown, an aperture forms the attachment point 14 herein, but it could also be formed of a loop or other engaged or engageable attachment point 14 adapted for connection of a fishing line thereto.

In all modes of the device 10 herein, at a second end of the body 12 opposite the first end 13 of the fishing lure device 10, there are included one or a plurality of secondary connection points 16 which are adapted for engagement to hooks or other fishing tackle the user would engage to the body 12 during use. As shown, currently, these secondary connection points 16 are formed as openings communicating through the body 12 adjacent the second end thereof.

Additionally preferred in all modes of the fishing lure device 10 herein disclosed is at least one slot 18 which communicates with the edge of the body 12 at the second end thereof. This slot 18 extends a distance into the body 12 from the second end toward the first end thereof, which may be fixed in length or may vary from ten to eighty percent of the distance of the body between the edge thereof at the first end 13 and the edge thereof at the second end.

Currently, one preferred length of extension of the slot 18 into the surface of the body 12 is between ⅛ to ¾ the total length of the body 12 and slightly longer, such as at least 20 percent, than the width of the two bendable portions 20 and 22 on opposing sides of the slot 18. Of course, multiple slots 18 may also be formed through the body 12, and such is anticipated within the scope of this invention, but currently a single slot 18 which defines bendable portions 20 and 22 on either side thereof, has shown to yield predictable movement of the body 12 when pulled through water, depending on the amount and number of bends.

Figure 2:
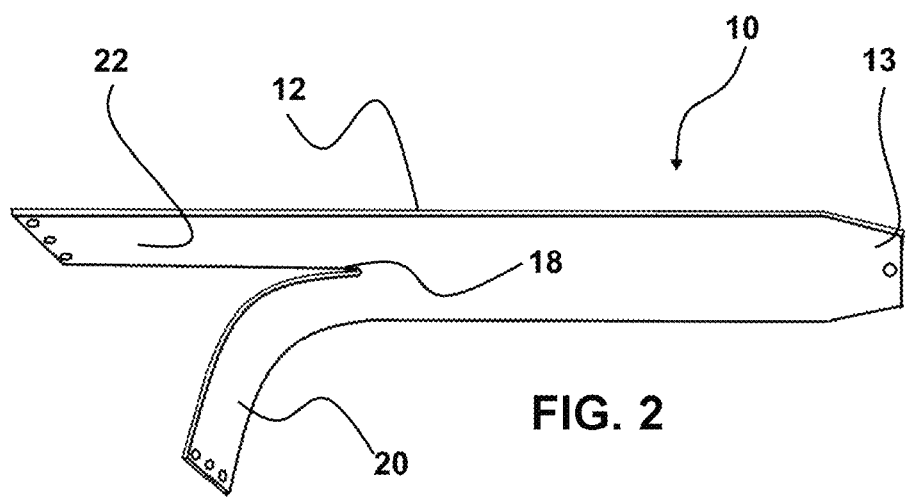
FIG. 2 is a lower perspective view showing a bend in a portion of the lure body which users may employ to change the movement of the lure when pulled through water.

As shown, for example, in FIG. 2, it is this slot 18 that provides the user the ability to bend a first bendable portion 20 of the body 12 situated on one side of the slot 18 and extending to the side edge or a second bendable portion 22 of the body 12 situated on the opposite side of the slot 18 and extending to the opposite side edge. As depicted in FIG. 2 but applicable to all modes of the body 12 of the lure device 10 herein, the first bendable portion 20 is in a bent or deformed configuration. In this configuration, as the body 12 is pulled through water by a fishing line engaged with the first end of the body 12, the body 12 will oscillate back and forth or will rotate in the water.

This movement, where the body 12 on one or both side surfaces is formed with a shiny or reflective finish 17 or surface will cause a flashing or oscillating reflection of light from that surface 17 to areas around the position of the body 12 of the lure device 10. This light flashing or reflection or oscillation is known to be highly attractive to some fish and likely to cause those fish to try and bite or swallow the body 12 when moving through the water. Where one or a plurality of hooks are engaged to the secondary connection points 16 adjacent the edge of the second end of the body 12, it can result in the engagement of those hooks with the mouth of the fish attempting to bite or swallow the body 12 of the lure which is flashing.

The bend angle or curve and the amount of bending of one or both the first bendable portion 20 and/or second bendable portion 22 will affect the rotation and/or undulation and/or other movements of the body 12 when being pulled through water. Thus, the user may bend and configure one or both of the bendable portions 20 and 22 to yield a customized desired movement of the body 12 during use. Further, the position and angle of the bends will cause movement and action changes by the body 12 when pulled through water.

Figure 3:
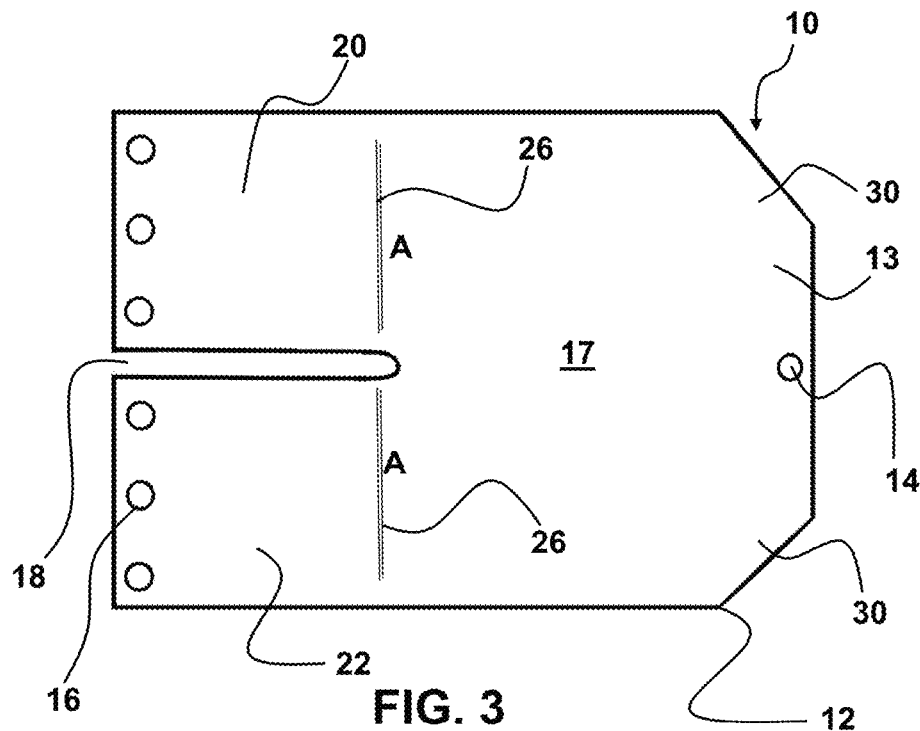
FIG. 3 shows the lure of FIGS. 1-2 wherein fold lines have been imparted into the surface of the body of the lure.
Figure 4:
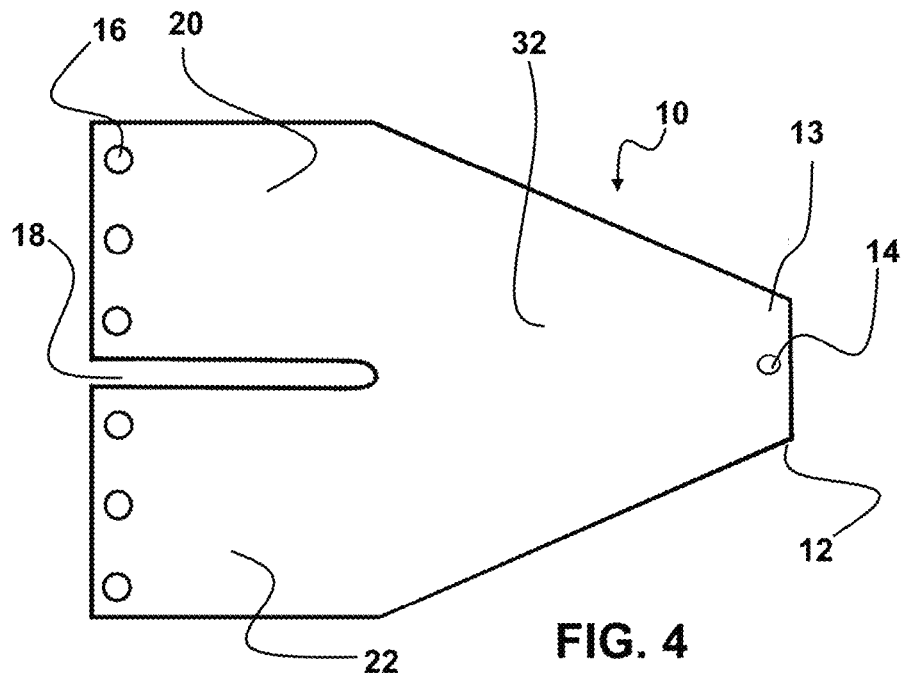
FIG. 4 shows another preferred mode of the lure device herein having a more triangular shape to the body.
Figure 5:
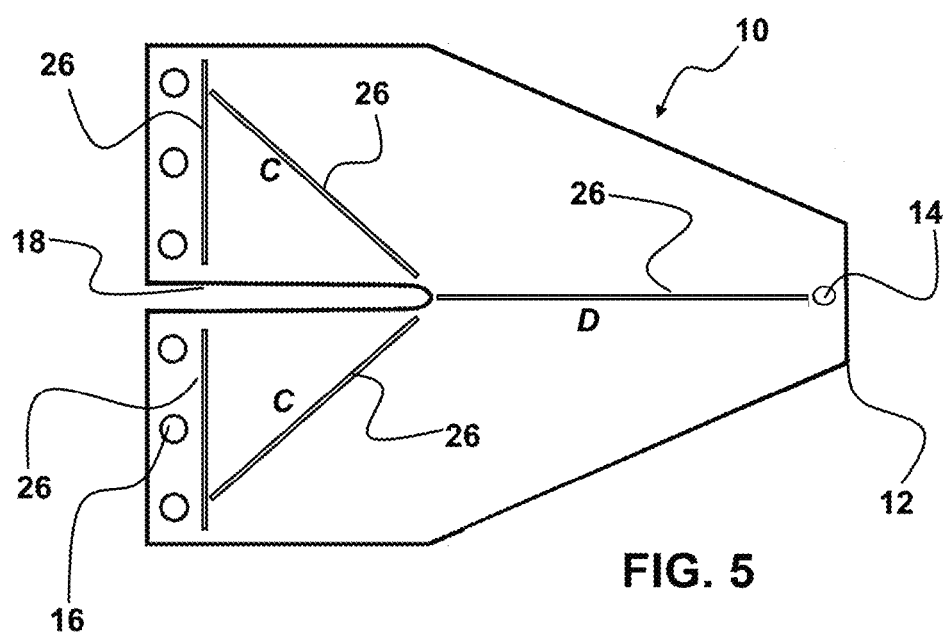
FIG. 5 depicts a view of the body of the device, as in FIG. 4, showing a plurality of bend lines formed into the body of the lure which may correlate to specific movement of the lure when pulled through water.

As shown in FIGS. 3 and 5, the body 12 of the lure device 10 herein may be provided with suggested fold lines 26 positioned adjacent to one or both bendable portions 20 and 22 of the body 12. The fold lines 26 may be imparted by engraving, laser etching, inked indicia, or other means for positioning fold lines 26 on the side surface of the body 12 to be employed by the user as a guide to bend the body 12 to yield a desired movement thereof during use.

These fold lines 26 may be correlated to a printed or computer depicted movement guide provided with the lure device 10. Thus, the user would be able to identify the specific fold line 26 which correlates in the guide to a specific movement a bend at that fold line 26 will create and then bend the appropriate fold line 26 to form the body 12 to a shape which the guide indicates a fold along a chosen fold line 26 will yield. In this mode of the lure device 10, the user is able to choose a movement desired which is shown in the guide, and then bend the correlating fold line 26 which the guide indicates will yield that chosen body movement.

Alternatively, anglers can experiment by bending the body 12 along one or more fold lines 26 positioned thereon and then have a way to achieve a desired movement of the body 12 they have bent in other bodies 12 at a future time. Thus, competitive anglers will be able to form the body 12 to customized bends at or adjacent the marked bend lines 26 and be able to repeat the process to achieve the same oscillation or rotation of the lure device 10 in the future to form other bodies 12 to their customized shape.

The body 12, in FIGS. 1-3, is shown as being substantially rectangular and having angled corner edge sections 30 on opposite sides at the first end of the body 12. These angled corner edge sections 30 have been shown in experimentation to yield more stable movement of the body 12 when pulled through water and are preferred.

In FIGS. 4-7 is shown another preferred configuration of the body 12 of the lure device 10 herein, which has a slanted or triangular first end 32, having angled side edges, where the first end 32 is adjacent to a rectangular second end formed by the bendable portions 20 and 22 on opposing sides of the slot 18. Also shown in FIG. 5 but employable in all configurations of the body 12 are multiple fold lines 26 imparted to the body 12, such as by scoring them into the surface or printing them upon the surface. As noted, a folding of the body 12 along one or more of these fold lines 26 can be correlated to a specific movement of the body 12 when pulled through water. The user may thus experiment with differing folds of one or both bendable portions 20 and 22 to achieve movement of the lure device 10 which catches more fish. They may then sketch or write down their proprietary bends so they may be repeated later on other lure devices 10 of the same configuration.

Alternatively, users may pick from a lure manufacturer provided guide the bends required for distinct movement of the lure device 10 when pulled through the water. Such, for example, can be a complete spin at a designated speed or an oscillating movement back and forth and defined number of oscillations per minute. In this example, bending one or both bendable portions 20 and 22 more or less would correlate to faster or slower back and forth oscillating movement of the lure device 10 when pulled through the water. The user may choose a desired movement of the body 12 from a guide, and then fold along a fold line 26 which will yield this body movement taught by the guide for such a fold or bend. Differing movements and speed thereof can be listed in a guide whereupon such may be achieved by the user when they bend the body 12 along one or a plurality of bend lines 26 the guide indicates as correlating with the desired body moments.

As noted, with the provided fold lines 26, competitive users may also make customized bends of one or both of the bendable portions 20 and 22 to yield a desired spin or oscillation of the lure device 10 for their purposes. Once a desired movement is achieved by that user, they may keep a diary of body movements which their own chosen bends along one or a plurality of the bend lines 16 provide. They will then have the ability to repeat the formation on another body 12 to yield the specific body movement through water. This would be valuable in competitive fishing should an angler find an especially prolific shape for the body 12 which yields more or better strikes by fish.

Figure 6:
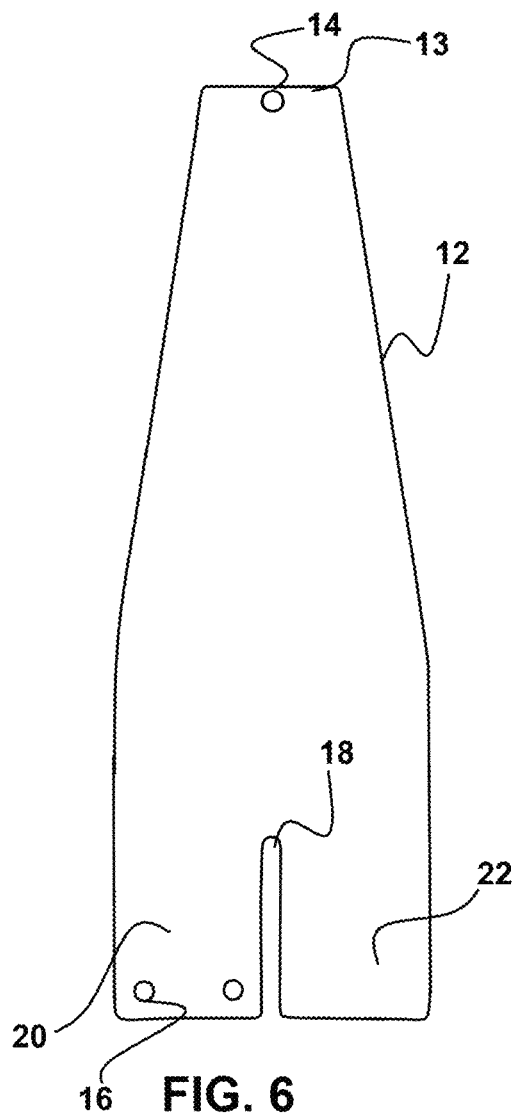
FIG. 6 shows another configuration of the body of the lure device herein having an elongated first body portion extending from the two bendable portions to the first edge of the device.

Shown in FIG. 6 is another configuration of the body 12 of the lure device 10 herein. As shown, the total length of the body 12 between the first end 13 and opposite second end is between three times and six times the width of the body at the second end. Thus, a six inch L1 length to a total two inch width W2 at the second end would be three times the width and a twelve inch length L1 would be six times the two inch width W2.

Figure 7:
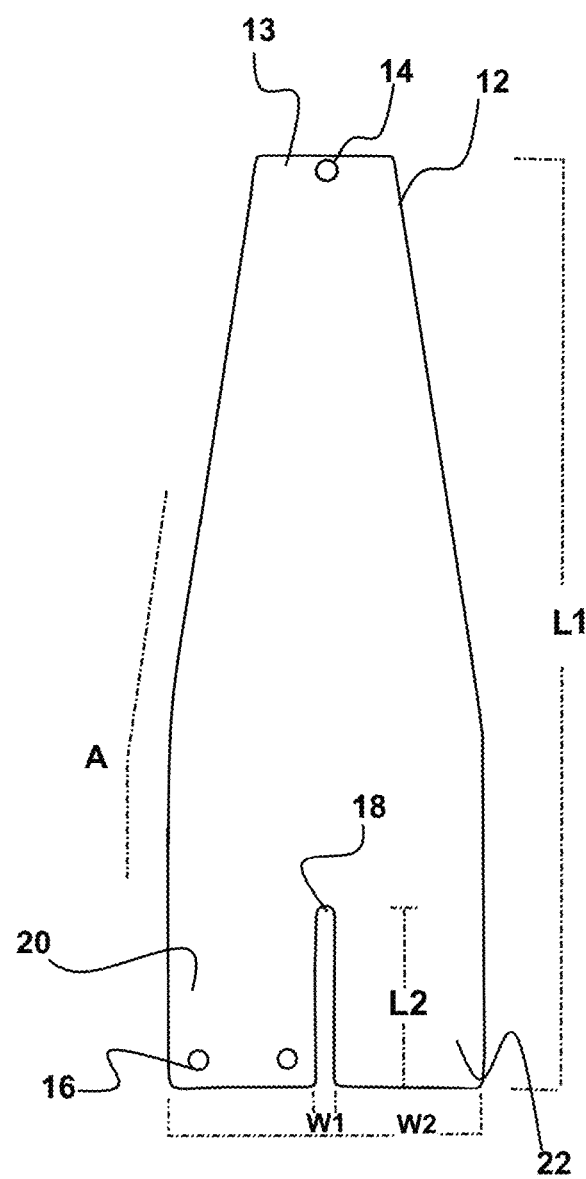
FIG. 7 shows a dimensional depiction of the device as in FIG. 6.

The bendable portions 20 and 22, shown in FIGS. 6-7, are substantially the length of the slot 18 and one half the total width W2 minus ½ the width of the slot 18. Thus, the bendable portions 20 and 22 are defined by the area of the body 12 on each side of the length of the slot 18 which extends to the side edge of the body 12 on the side where the bendable portion 20 or 22 is positioned. Thus, the area of the bendable portions 20 and 22 can be defined as the area on one side of the slot 18 extending across the body 12 for the length of the slot 18 to a side edge of the body which is also the side edge of the bendable portions 20 and 22.

Shown in FIG. 7 is a dimensional depiction of the elongated mode of the lure device 10 herein, as in FIG. 6. As shown, the body has a total length L1 between the first end 13 and opposite second end. This length L1 may vary from 5 inches to 12 inches. It has a width W2 which is between 1.5 to 2.5 inches.

The slot 18 communicates through the body 12 from the second end for a distance L2 which in all configurations of the device 10 is between 0.75 inches to 1.5 inches which has shown to provide a wide variety of oscillation and spinning movements of the body 12 when pulled through the water depending on how one or both of the bendable portions 20 and 22 are bend or curved such as shown in FIG. 2.

As noted, any of the different configurations and components of the fishing lure device and system shown and described herein or the steps in forming it to an optimum configuration thereof, can be employed with any other configuration or component shown and described. Additionally, while the disclosed user configurable fishing lure herein has been described herein with reference to particular embodiments thereof and components thereof operatively engaged for operation, a latitude of equivalent modifications, various changes and substitutions are intended in the foregoing disclosures and it will be appreciated that in some instance some features, or configurations, or operations of the fishing lure invention could be employed without a corresponding use of other features, without departing from the scope of the invention as set forth in the following claims. All such changes, alternations and modifications for a substantially equivalent structure or system as would occur to those skilled in the art subsequent to reviewing this specification, are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract included herein is neither intended to define the invention of the application, which is measured by the claims, nor is it intended to be limiting, as to the scope of the invention in any way.

What is claimed is:

1. A user-configurable fishing lure comprising:
   a lure body, said lure body being planar, said lure body extending a length thereof from a first end to a second end thereof;
   said body having a width extending between a first side edge thereof and an opposite second side edge thereof;
   said lure body formed of a memory material which will hold a bend once formed therein;
   an attachment point located at said first end for a fishing line thereto;
   a secondary attachment point located at said second end;
   a slot communicating through said body, said slot extending from said second end of said body toward said first end of said body;
   a first bendable portion defined by an area of said body on a first side of said slot, said first bendable portion extending from said slot to said first side edge of said body;
   a second bendable portion defined by an area of said body on a second side of said slot, opposite said first side of said slot, said second bendable portion extending from said slot to said second side edge of said body opposite said first side edge; and
   both said first bendable portion and said second bendable portion being deformable by bending to bent configurations of said first bendable portion or said second bendable portion; wherein rotational or oscillating movement of said body of said lure is adjustable by changing a shape of said bent configurations.

2. The user-configurable fishing lure of claim 1 wherein said memory material forming said body is one or a combination of metals from a group of metals including steel, stainless steel, brass, bronze, tin, and copper.

3. The user-configurable fishing lure of claim 1 wherein said slot extends between a slot distance which is ten to eighty percent of the length of the body extending from the first end thereof to the second end thereof.

4. The user-configurable fishing lure of claim 2 wherein said slot extends between a slot distance which is ten to eighty percent of the length of the body extending from the first end thereof to the second end thereof.

5. The user-configurable fishing lure of claim 1 wherein said slot extends a slot length from said second end of said body toward said first end of said body; and
   said slot length is between 0.75 to 2 inches.

6. The user-configurable fishing lure of claim 2 wherein said slot extends a slot length from said second end of said body toward said first end of said body; and
   said slot length is between 0.75 to 2 inches.

7. The user-configurable fishing lure of claim 1 additionally comprising:
   one or a plurality of fold lines positioned on said body; and
   said fold lines designating positions for forming bends of said first bendable portion or said second bendable portion at a fixed position upon said body, whereby a bend at a said fold line on a first said body may be repeated on a second said body by repeating the same said bend at a similarly positioned fold line on said second body, to thereby impart similar bend induced movements to said second body as said first body.

8. The user-configurable fishing lure of claim 5 additionally comprising:
   one or a plurality of fold lines positioned on said body; and
   said fold lines designating positions for forming bends of said first bendable portion or said second bendable portion at a fixed position upon said body, whereby a bend at a said fold line on a first said body may be repeated on a second said body by repeating the same said bend at a similarly positioned fold line on said second body, to thereby impart similar bend induced movements to said second body as said first body.

9. The user-configurable fishing lure of claim 6 additionally comprising:

one or a plurality of fold lines positioned on said body; and said fold lines designating positions for forming bends of said first bendable portion or said second bendable portion at a fixed position upon said body, whereby a bend at a said fold line on a first said body may be repeated on a second said body by repeating the same said bend at a similarly positioned fold line on said second body, to thereby impart similar bend induced movements to said second body as said first body.

* * * * *